United States Patent [19]
Yamamoto et al.

[11] Patent Number: 5,605,997
[45] Date of Patent: *Feb. 25, 1997

[54] PROCESS FOR PRODUCING ORGANOPOLYSILOXANES

[75] Inventors: Kenji Yamamoto; Masaaki Yamaya, both of Matsuida-machi, Japan

[73] Assignee: Shin-Etsu Chemical Co., Ltd., Tokyo, Japan

[ * ] Notice: The term of this patent shall not extend beyond the expiration date of Pat. No. 5,478,456.

[21] Appl. No.: 539,701

[22] Filed: Oct. 5, 1995

[30] Foreign Application Priority Data

Oct. 6, 1994 [JP] Japan .................................. 6-268373

[51] Int. Cl.$^6$ .................................................. C08G 77/08
[52] U.S. Cl. .............................. 528/10; 528/18; 528/21; 556/453; 556/455; 556/456; 556/457; 556/458
[58] Field of Search ..................... 556/453, 455, 556/456, 457, 458; 528/10, 18, 21

[56] References Cited

U.S. PATENT DOCUMENTS 5,478,546  12/1995  Matsumura et al. .................... 556/455

FOREIGN PATENT DOCUMENTS 0535687  4/1993  European Pat. Off. .
0672702  9/1995  European Pat. Off. .

OTHER PUBLICATIONS

Database WPI, Derwent Publications, AN 84–221813, JP-A-59 129 230, Jul. 25, 1984.

*Primary Examiner*—Melvyn I. Marquis
*Attorney, Agent, or Firm*—Oblon, Spivak, McClelland, Maier & Neustadt, P.C.

[57] ABSTRACT

A process of producing an organopolysiloxane, comprising hydrolyzing and condensing an alkoxysilane having the formula:

$$R_m Si(OR^1)_{4-m}$$

wherein R is a monovalent hydrocarbon group, $R^1$ is an alkyl group and m is an integer of 0 to 3, or a partial hydrolysis-condensation product thereof, in the presence of a fluorine compound selected from the group consisting of fluoride salt compounds and fluorine-containing silicon compounds having at least one Si-F bond in its molecule. The organopolysiloxane obtained contains little silanol groups and has a narrow molecular weight distribution. Therefore, curable silicone resin compositions containing the organopolysiloxane as a raw material have good shelf stability, drying characteristics and curability, and are free of fear of catching fire or contamination of surroundings. An organopolysiloxane having a variety of functional groups can be readily produced.

8 Claims, No Drawings

PROCESS FOR PRODUCING ORGANOPOLYSILOXANES

BACKGROUND OF THE INVENTION

1. Field of the Invention

The present invention relates to a process for producing organopolysiloxanes.

2. Description of the Prior Art

Heretofore, as a process of producing an organopolysiloxane, is known a process in which halosilanes such as organochlorosilanes and water are mixed, thereby these being hydrolyzed and condensed. This process is advantageous in cost, but where starting materials mainly contain three functional silanes, the reaction solution itself may form a gel or organopolysiloxane microgels may be formed in the reaction solution, so that processability is lowered.

As a process of production capable of controlling the gelation or formation of the microgel, a process is known in which alkoxysilanes which exhibit a lower hydrolysis rate than the halosilanes are hydrolyzed and condensed using an acid or alkaline catalyst. According to this process, not only the hydrolysis rate of the alkoxysilanes but also the rate of condensation of silanol groups are low. Consequently, the resulting organopolysiloxane contains an increased unreacted silanol groups, and has a broad molecular weight distribution. That is, for example, an organopolysiloxane having a weight average molecular weight of about 5,000 will have a polydispersion degree (ratio of weight average molecular weight (Mw) to number average molecular weight (Mw)) of 3 or more. The organopolysiloxane having self-condensable silanol groups produced by the process can be used as a starting material for heat-curable silicone resin compositions in which silanol groups act as functional groups, but it is unsuitable as a raw material for moisture-curable silicone resin compositions in which hydrolyzable groups such as alkoxyl groups act as a crosslinking functional group because it makes the shelf stability of the composition poor. Since the resulting organopolysiloxane has a broad distribution of molecular weight, it is liable to form a gel due to a high molecular weight organopolysiloxane contained, and curable silicone compositions prepared therefrom have a poor drying property and curability due to low molecular weight organopolysiloxanes contained. Furthermore, where the low molecular weight organopolysiloxanes are volatile, there is a fear of catching fire. The low molecular weight components also have disadvantage of contaminating surroundings.

SUMMARY OF THE INVENTION

An object of the present invention is to provide a process capable of producing an organopolysiloxane containing little silanol groups and having a narrow molecular weight distribution.

Thus, the present invention provides a process of producing an organopolysiloxane, comprising hydrolyzing and condensing at least one alkoxyl-containing organosilicon compound selected from the group consisting of an alkoxysilane having the general formula:

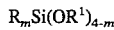

$$R_m Si(OR^1)_{4-m}$$

wherein R is a monovalent hydrocarbon group, $R^1$ is an alkyl group and m is an integer of 0 to 3, and partial hydrolysis-condensation products thereof, in the presence of a fluorine compound selected from the group consisting of fluoride salt compounds and fluorine-containing silicon compounds having at least one Si-F bond in its molecule.

According to the present invention, the organopolysiloxane obtained contains little silanol groups and has a narrow molecular weight distribution. For example, it is possible to produce an organopolysiloxane having a weight average molecular weight of about 5,000 with a degree of polydispersion (Mw/Mn) being 3 or less. Therefore, curable silicone resin compositions prepared using the resulting organopolysiloxane as a raw material have good shelf stability, drying characteristics and curability, and are free of fear of catching fire or contamination of surroundings. Since the catalytic action of the fluorine compound is effected sufficiently at a neutral pH, the selection of a neutral fluorine compound as a hydrolysis-condensation catalyst makes it possible to subject an organoalkoxysilane containing a functional group which is susceptible to chemical reaction caused by an acid or alkali or cleavage of bonding to a silicon atom, to cohydrolysis-condensation; thereby organopolysiloxanes having a variety of functional groups can be readily produced.

The coating materials containing the organopolysiloxane obtained according to the present invention have a low flash point, have good drying characteristics and shelf stability and form a film with a high hardness.

DETAILED DESCRIPTION OF THE PREFERRED EMBODIMENTS

The present invention is now described in detail.

Fluorine Ccompounds

The fluorine compound used in the present invention is used for accelerate the hydrolysis-polycondensation reaction of the alkoxy-containing organosilicon compound, and is selected from fluoride salt compounds and fluorine-containing silicon compounds having at least one Si-F bond.

The fluoride salt compounds above include, for example, LiF, NaF, KF, RbF, CsF and the like, fluoride salt compounds of Group II elements such as $BeF_2$, $MgF_2$, $CaF_2$, $SrF_2$, $BaF_2$ and the like, fluoride salt compounds of Group III elements such as $BF_3$, $AlF_3$, $GaF_3$, $InF_3$, $TlF_3$ and the like, fluoride salt compounds such as $CuF_2$, $ZnF_2$, $SnF_2$, $PdF_2$, $SbF_3$, $CrF_3$, $YF_3$ and the like, fluoride salt compounds of lanthanide elements such as $LaF_3$, $CeF_3$, $PrF_3$, $NdF_3$, $SmF_3$, $EuF_3$, $GdF_3$, $TbF_3$, $DYF_3$, $HoF_3$, $ErF_3$ and the like, quarternary ammonium salts such as $NH \cdot F$, $(CH_3)_4 N \cdot F$, $(CH_3CH_2)_4 N \cdot F$, $(CH_3CH_2CH_2)_4 N \cdot F$, $(CH_3CH_2CH_2CH_2)_4 N \cdot F$ and the like, and hydrates of these compounds.

The fluorine-containing silicon compounds having at least one Si-F bond in its molecule may be any of organic compounds and inorganic compounds as long as the compounds have a Si-F bond in the molecule, and include, e.g., silane compounds such as $FSi(OCH_3)_3$, $FSi(OC_2H_5)_3$, $FSi(OC_3H_7)_3$, $FSi(OC_4H_9)_3$, $F_2Si(OCH_3)_2$, $F_2Si(OC_2H_5)_2$, $F_2Si(OC_3H_7)_2$, $F_2Si(OC_4H_9)_2$, $F_3SiOCH_3$, $F_3SiOC_2H_5$, $F_3SiOC_3H_7$, $F_3SiOC_4H_9$, $FSi(CH_3)_3$, $FSi(C_2H_5)_3$, $FSi(C_3H_7)_3$, $FSi(C_4H_9)_3$, $F_2Si(CH_3)_2$, $F_2Si(C_2H_5)_2$, $F_2Si(C_3H_7)_2$, $F_2Si(C_4H_9)_2$, $F_3SiCH_3$, $F_3SiC_2H_5$, $F_3SiC_4H_7$, $F_3SiC_4H_9$ and the like, and other organosilicon compounds such as polysiloxanes or polysilanes having Si-F bonding; and inorganic silicon compounds such as $SiF_4$, $H_2SiF_6$, $Na_2SiF_6$ and $(NH_4)_2SiF_6$. These fluorine compounds may be used singly or in combination of two or more.

The fluorine compounds preferably have a solubility of at least 5% in respect of water. If the solubility is too small, a sufficient catalytic action may not be expected. Among the compounds above, taking cost, solubility with respect to water, handleability and safety into account, NaF, KF, $(CH_3CH_2CH_2CH_2)_4N \cdot F$, $FSi(OCH_3)_3$, $FSi(OC_2H_5)_3$ and $(NH_4)_2SiF_6$ are preferred.

Although the amount of a fluorine compound to be added cannot be decided generally because it varies depending on the kind of the fluorine compound, it normally ranges from 1 ppm to 5% by weight on the basis of the alkenyl-containing organosilicon compound described later. For example, in the case of neutral salts such as NaF and KF which can be handled with ease, the amount thereof is preferably in the range of 10 ppm to 1%. If the amount is too small, the catalytic action may not be exerted. If the amount is too large, the catalytic action may not be exerted for the amount.

Alkoxyl-containing Organosilicon Compound

The alkoxysilane which may be used in the present invention is a silane compound having a hydrolyzable alkoxyl group in the molecule, and is represented by the general formula:

$$R_m Si(OR^1)_{4-m}$$

wherein R is a monovalent hydrocarbon group, $R^1$ is an alkyl group and m is an integer of 0 to 3.

The monovalent hydrocarbon group represented by the R includes, for example, alkyl groups having up to 10 carbon atoms such as methyl, ethyl, propyl, butyl pentyl, hexyl, heptyl, octyl, and the like, cycloalkyl groups such as cyclohexyl, aryl groups such as phenyl and the like, and araryl groups such as benzyl and phenylethyl, the hydrogen atoms of which may be partly or completely substituted by a halogen atom or the hydroxyl group. Out of them, preferred are alkyl groups having up to 10 carbon atoms and aryl groups.

The alkyl group represented by the $R^1$ includes, for example, alkyl groups having up to 10 carbon atoms such as methyl, ethyl, propyl, butyl, pentyl, hexyl, heptyl, octyl and the like. Out of them, preferred are alkyl groups having up to 5 carbon atoms, such as methyl, ethyl, propyl, butyl and pentyl.

Typical examples of the alkoxysilane which may be used in the present invention are as given below. In the following, Ph stands for the phenyl group.

Examples having three or four alkoxyl groups include
$Si(OCH_3)_4$, $Si(OC_2H_5)_4$, $Si(OC_3H_7)_4$,
$Si(OC_4H_9)_4$, $Si(OC_5H_{11})_4$, $CH_3Si(OCH_3)_3$,
$CH_3Si(OC_2H_5)_3$, $CH_3Si(OC_3H_7)_3$,
$CH_3Si(OC_4H_9)_3$, $C_2H_5Si(OCH_3)_3$,
$C_2H_5Si(OC_2H_5)_3$, $C_2H_5Si(OC_3H_7)_3$,
$C_2H_5Si(OC_4H_9)_3$, $C_3H_7Si(OCH_3)_3$,
$C_3H_7Si(OC_2H_5)_3$, $C_3H_7Si(OC_3H_7)_3$,
$C_3H_7Si(OC_4H_9)_3$, $C_4H_9Si(OCH_3)_3$,
$C_4H_9Si(OC_2H_5)_3$, $C_4H_9Si(OC_3H_7)_3$,
$C_4H_9Si(OC_4H_9)_3$, $C_5H_{11}Si(OCH_3)_3$
$C_5H_{11}Si(OC_2H_5)_3$, $C_{10}H_{21}Si(OCH_3)_3$
$C_{10}H_{21}Si(OC_2H_5)_3$, $PhSi(OCH_3)_3$,
$PhSi(OC_2H_5)_3$, $PhSi(OC_3H_7)_3$,
$PhSi(OC_4H_9)_3$, $PhSi(OC_5H_{11})_3$ and the like.

Examples having two alkoxyl groups include
$(CH_3)_2Si(OCH_3)_2$, $(CH_3)_2Si(OC_2H_5)_2$,
$(CH_3)_2Si(OC_3H_7)_2$, $(CH_3)_2Si(OC_4H_9)_2$,
$(C_2H_5)_2Si(OCH_3)_2$, $(C_2H_5)_2Si(OC_2H_5)_2$,
$(C_2H_5)_2Si(OC_3H_7)_2$,
$(C_2H_5)_2Si(OC_4H_9)_2$,
$(C_3H_7)_2Si(OCH_3)_2$, $(C_3H_7)_2Si(OC_2H_5)_2$,
$(C_3H_7)_2Si(OC_3H_7)_2$,
$(C_3H_7)_2Si(OC_4H_9)_2$, $(C_4H_9)_2Si(OCH_3)_2$,
$(C_4H_9)_2Si(OC_2H_5)_2$,
$(C_4H_9)_2Si(OC_3H_7)_2$,
$(C_4H_9)_2Si(OC_4H_9)_2$, $(Ph)_2Si(OCH_3)_2$,
$(Ph)_2Si(OC_2H_5)_2$, $(Ph)_2Si(OC_3H_7)_2$,
$(Ph)_2Si(OC_4H_9)_2$ and the like.

Examples having one alkoxyl group include
$CH_3)_3SiOCH_3$, $(CH_3)_3SiOC_2H_5$,
$(CH_3)_3SiOC_3H_7$, $(CH_3)_3SiOC_4H_9$,
$(C_2H_5)_3SiOCH_3$, $(C_2H_5)_3SiOC_2H_5$,
$(C_2H_5)_3SiOC_3H_7$, $(C_2H_5)_3SiOC_4H_9$,
$(C_3H_7)_3SiOCH_3$, $(C_3H_7)_3SiOC_2H_5$,
$(C_3H_7)_3SiOC_3H_7$, $(C_3H_7)_3SiOC_4H_5$,
$(C_4H_9)_3SiOCH_3$, $(C_4H_9)_3SiOC_2H_5$,
$(C_4H_9)_3SiOC_3H_7$, $(C_4H_9)_3SiOC_4H_9$,
$(Ph)_3SiOCH_3$, $(Ph)_3SiOC_2H_5$,
$(Ph)_3SiOC_3H_7$, $(Ph)_3SiOC_4H_9$ and the like.

Examples of the partial hydrolysis-condensation products of the alkoxysilanes include

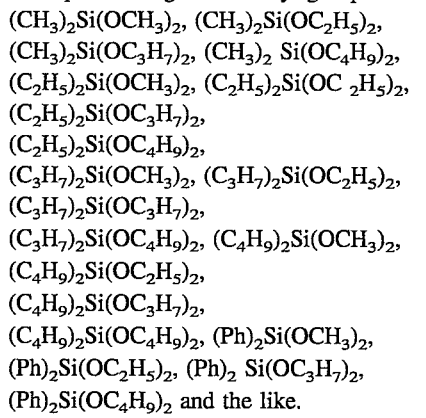

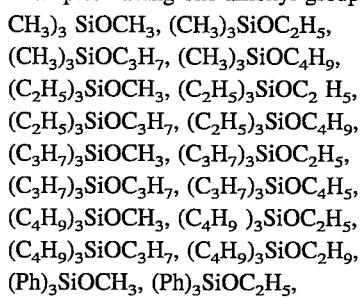

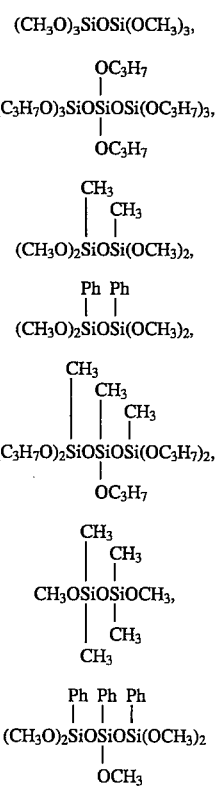

and the like. These may comprise not only linear oligomers but also low molecular weight cyclic siloxanes.

The alkoxyl-containing organosilicon compounds may be used singly or in combination of two or more. The use of an alkoxysilane having three or four alkoxyl groups in combination with 30% by weight or less of alkoxysilanes having one or two alkoxyl groups based on the entire mixture of the organosilicon compounds will give a solid organopolysiloxane. The use of an alkoxysilane having three or four alkoxyl groups in combination with more than 30% by weight preferably 30–60% by weight of alkoxysilanes having one or two alkoxyl silanes based on the entire mixture of the organosilicon compounds will give a liquid or oily organopolysiloxane. Therefore, for example, in the case where an organopolysiloxane to be used as a main ingredient of a coating material is produced, it is preferred to use alkoxysilanes having one or two alkoxyl groups in an amount of more than 30% by weight preferably 30–60% by weight in combination with an alkoxysilane having three or four alkoxyl groups.

Hydrolysis-condensation Reaction

The hydrolysis-condensation reaction of the alkoxyl-containing organosilicon compound is carried out by mixing it with water in the presence of the fluorine compound described above.

For the reaction, a solvent may be used for dilution. The diluent solvent may be any solvent in which the starting organosilicon compound and the resulting organopolysiloxane can be dissolved, including typically organic solvents such as toluene, xylene, acetone, methanol and ethanol. The solvent is generally used in an amount of 0.1 to 10 times, by weight, the amount of the alkoxyl-containing silicon compound.

The amount of water to be mixed with the alkoxyl-containing organosilicon compound for the hydrolysis-polycondensation reaction is generally 0.1 to 2.0 times, on the molar basis, the mole numbers of the alkoxyl groups of the alkoxyl-containing organosilicon compound. The organopolysiloxane obtained according to the present process contains a very small number of remaining silanol groups, and the entire water added used for the production is consumed for the formation of siloxane linkage. Therefore, the molecular weight of the resulting organopolysiloxane can be readily controlled by changing the amount of water. Specifically, if the amount of water on the molar basis is not more than 0.5 times the mole number of the alkoxyl groups, an organopolysiloxane with a lower molecular weight can be produced. If the amount of water on the molar basis is more than 0.5 times the mole number of the alkoxyl groups, an organopolysiloxane with a higher molecular weight can be produced.

Mixing of the alkoxyl-containing organosilicon compound with water is generally carried out by pouring water into the solution of the alkoxyl-containing organosilicon compound under stirring or by pouring the latter solution into water.

The fluorine compound described above is preferably added to the reaction system as a solution thereof in water or a suitable organic solvent. Alternatively, it may be previously added to the alkoxyl-containing organosilicon compound or water to be used for the hydrolysis. It may be also added to a previously prepared mixture of water and the alkoxyl-containing organosilicon compound.

The reaction is normally carried out at 0° to 200° C., preferably at 10° to 100° C. for 0.5 to 12 hours. The resulting organopolysiloxane solution is optionally washed with water or subjected to filtration to remove the fluorine compound, and is subjected to distillation or another treatment to remove the solvent, a by-produced alcohol, excess water, etc. After that, the concentration is adjusted to a suitable level as necessary.

Additionally, in respect of the conditions other than those describe above, the production process of the present invention can be carried out in the same manner as in the conventional production process in which an alkoxysilane is subjected to hydrolysis-condensation in the presence of an acid or alkali catalyst.

The process of the present invention is suited to production of organopolysiloxanes containing remaining silanol groups in an amount of 0.1% by weight or less, preferably 0.5% by weight or less.

Applicability

The organopolysiloxane obtained according to the production process of the present invention is used favorably as a vehicle for paints or a resin for coating or binder. Especially, it is suitable as a curing catalyst having crosslinkable alkoxyl groups which is previously added to moisture-curable silicone coating compositions.

The silicone coating compositions include, for example, compositions comprising a mixture of 100 g of an organopolysiloxane obtained by the process of the present invention, 0.01 to 5 g of an organometallic catalyst, and 0 to 1,000 g of a diluent organic solvent.

The organometallic catalyst includes, for example, aluminum compounds such as aluminum acetylacetonate, tin compounds such as dibutyltin ethyl acetoacetate, and titanium compounds such as tetrabutyltitanium.

The diluent organic solvent includes, for example, toluene, xylene, methanol, ethanol, isopropanol, hexane, industrial gasoline and the like.

To the coating material may be optionally added with a variety of pigments, dyes, leveling agents, adhesive aids, stabilizers, etc. in such an amount that the properties of the composition are not adversely affected.

EXAMPLES

The present invention will now be described in more detail with reference to working examples and comparative examples.

Example 1

To 1L flask were added 272 g of monomethyltrimethoxysilane, 149 g of diphenyldimethoxysilane, 210 g of methanol, and a fluorine compound in an amount as given in Table 1, and these were stirred with the temperature being kept at 40° C. Subsequently, to the mixture water in an amount as given in Table 1 was added dropwise over 1 hour, followed by stirring at 40° C. for two hours, to carry out hydrolysis and condensation. The solution thus obtained was distilled under a reduced pressure of 40mmHg at 40° C. to remove methanol. When the concentration of the resin became 60%, the reaction mixture was cooled to 25° C., so that the fluorine compound was precipitated. The fluorine compound precipitated was filtered off to give an organopolysiloxane. The average molecular weight, polydispersion of molecular weight distribution, and content of silanol groups of the organopolysiloxane obtained are given in Table 1. The average molecular weights and polydispersion were values in terms of polystyrene sought from measurement by GPC.

Comparative Examples 1 and 2

To 1L flask were added 272 g of monomethyltrimethoxysilane, 149 g of diphenyldimethoxysilane, 210 g of methanol, and $H_2SO_4$ in an amount as given in Table 1, and these were stirred with the temperature being kept at 40° C. Subsequently, to the mixture water in an amount as given in Table 1 was added dropwise over 1 hour, followed by stirring at 40° C. for two hours, to carry out hydrolysis and condensation. The reaction mixture thus obtained was added with $NaHCO_3$ in an neutralization equivalent amount, followed by stirring at 30° C. for two hours to stop the reaction. The resulting solution was distilled under a reduced pressure of 40 mmHg at 40° C. to remove methanol. When the resin concentration became 60%, the reaction mixture was cooled to 25° C., so that the neutral salt was precipitated. The neutral salt precipitated was filtered off to give an organopolysiloxane. The average molecular weight, polydispersion of molecular weight distribution, and the content of silanol groups of the organopolysiloxane obtained are given in Table 1.

Comparative Examples 3 and 4

In each of these examples, the procedure of comparative Example 1 or 2 was repeated, except that the hydrolysis-condensation catalyst was replaced by monoethylamine or sodium ethoxide and that acetic acid was used as a neutralizing agent in an amount of 1.2 times the equivalent amount. The average molecular weight, polydispersion of molecular weight distribution, and content of silanol groups of the organopolysiloxanes obtained are given in Table 1.

Example 7

Evaluation of clear coating films

To 100 g of the organopolysiloxane obtained in Example 2 was added 1 g of tetrabutyl titanate, and mixing was performed at 25° C. for two hours to prepare a coating liquid.

The coating liquid was applied to the surface of a polished steel plate with a bar coater No. 20, and dried at 25° C. for two days to cure, thereby a clear coating film being formed. The clear film was evaluated for the properties below. The results are given in Table 2.

Drying characteristics

After a coating liquid was applied, the coating film was dried at 25° C. Under the conditions, a time period required for the coating film to become tack-free, was measured.

Pencil hardness test

The clear film formed was tested for hardness according to JIS H0201.

Flash point

Flash point was measured according to the method of JIS K2265.

Contamination properties

A test sample on which the clear film as mentioned above was formed, was placed on the surface of a contamination-free polished copper plate. The test sample together with the copper plate was heated at 250° C. for 30 minutes in a drying chamber. Examination was made as to whether parts of the copper plate surface surrounding the test sample had become water-repellent.

Stability

An acceleration test was performed by hermetically containing a coating liquid in a container and keeping it at 40° C. in a drying chamber. Evaluation was made as below.

Bad: Gelation occurred within 50 days.

Good: No change was observed even after 50 days.

Comparative Example 5

The procedure of Example 7 was repeated, except that the organopolysiloxane as prepared in Comparative Example 1 was used. The results are given in Table 2.

TABLE 1

|  | Catalyst | *1 Catalys Amount, % | *2 Water amount | Average molecular weight | polydispersion (Mw/Mn) | SiOH content wt. % |
|---|---|---|---|---|---|---|
| Example 1 | NaF | 0.0001 | 1.0 | 100,000 | 9 | 0.1 |
| Example 2 | NaF | 0.005 | 0.4 | 6,000 | 2.8 | 0.1 |
| Example 3 | NaF | 5 | 0.2 | 300 | 1.5 | <0.1 |
| Example 4 | $(C_4H_9)_4NF$ | 0.01 | 0.3 | 3,000 | 2.1 | <0.1 |
| Example 5 | NaF | 0.00005 | 1.0 | 200 | 1.2 | 0.3 |
| Example 6 | NaF | 7 | 0.2 | 300 | 1.5 | <0.1 |
| Com. Example 1 | $H_2SO_4$ | 0.05 | 0.4 | 1,000 | 3 | 1.5 |
| Com. Example 2 | $H_2SO_4$ | 5 | 0.2 | 300 | 2.5 | 0.8 |
| Com. Example 3 | $C_2H_5NH$ | 0.05 | 0.4 | 700 | 2.3 | 1.0 |
| Com. Example 4 | $C_2H_5ONa$ | 0.01 | 0.8 | 100,000 | 20 | 0.1 |

Remarks
*1 weight % based on the amount of an alkoxysilane used.
*2 molar ratio of water to the alkoxyl groups of the alkoxysilane.

TABLE 2

|  | Film thickness μm | Drying characteristics, min. | Pencil hardness | Flash point | Contamination | Stability |
| --- | --- | --- | --- | --- | --- | --- |
| Example 7 | 19 | 10 | 2H | Equivalent to 2nd class petroleum | not observed | Good |
| Comparative Example | 21 | 60 | F | Equivalent to 1st class petroleum | Observed | Bad |

We claim:

1. A process of producing an organopolysiloxane, comprising hydrolyzing and condensing at least one alkoxyl-containing organosilicon compound selected from the group consisting of an alkoxysilane having the general formula:

$$R_m Si(OR^1)_{4-m}$$

wherein R is a monovalent hydrocarbon group, $R^1$ is an alkyl group and m is an integer of 0 to 3, and partial hydrolysis-condensation products thereof, in the presence of a fluorine compound selected from the group consisting of fluoride salt compounds and fluorine-containing silicon compounds having at least one Si-F bond in its molecule.

2. Process of claim 1, wherein the fluorine compound is selected from the group consisting of NaF, KF, $(CH_3CH_2CH_2CH_2)_4NF$, $FSi(OCH_3)_3$, $FSi(OC_2H_5)_3$ and $(NH_4)_2SiF$.

3. The process of claim 1, wherein in said general formula R is an alkyl group having 1 to 10 carbon atoms or an aryl group, $R^1$ is an alkyl group having 1 to 5 carbon atoms.

4. The process of claim 1, wherein the alkoxysilane is an mixture of an alkoxysilane having three or four alkoxyl groups and an alkoxysilane having one or two alkoxyl groups in an amount of 30% by weight or less based on said mixture, thereby a solid organopolysiloxane is produced.

5. The process of claim 1, wherein the alkoxysilane is an mixture of an alkoxysilane having three or four alkoxyl groups and an alkoxysilane having one or two alkoxyl groups in an amount of more than 30% by weight based on said mixture, thereby a liquid or oily organopolysiloxane is produced.

6. The process of claim 1, wherein the amount of the fluorine compound is 1 ppm to 10% by weight based on the alkoxyl-containing organosilicon compound, and the amount of water on the molar basis is 0.1 to 2.0 times the mole number of the alkoxyl groups contained in the alkoxyl-containing organosilicon compound.

7. The process of claim 1, wherein the hydrolysis-condensation is carried out at a temperature of 0° to 200° C.

8. The process of claim 1, wherein the organopolysiloxane produced contains silanol groups in an amount of 1.0% by weight or less.

* * * * *

UNITED STATES PATENT AND TRADEMARK OFFICE
CERTIFICATE OF CORRECTION

PATENT NO. : 5,605,997
DATED : February 25, 1997
INVENTOR(S) : Kenji YAMAMOTO, et al.

It is certified that error appears in the above-indentified patent and that said Letters Patent is hereby corrected as shown below:

On the title page, Item [*], the Terminal Disclaimer information is incorrect. It should read:

-- [*] Notice: The term of this patent shall not extend beyond the expiration date of Pat. No. 5,478,546. --

Signed and Sealed this

Eighth Day of July, 1997

*Attest:*

BRUCE LEHMAN

*Attesting Officer*     *Commissioner of Patents and Trademarks*